Patented Sept. 29, 1931

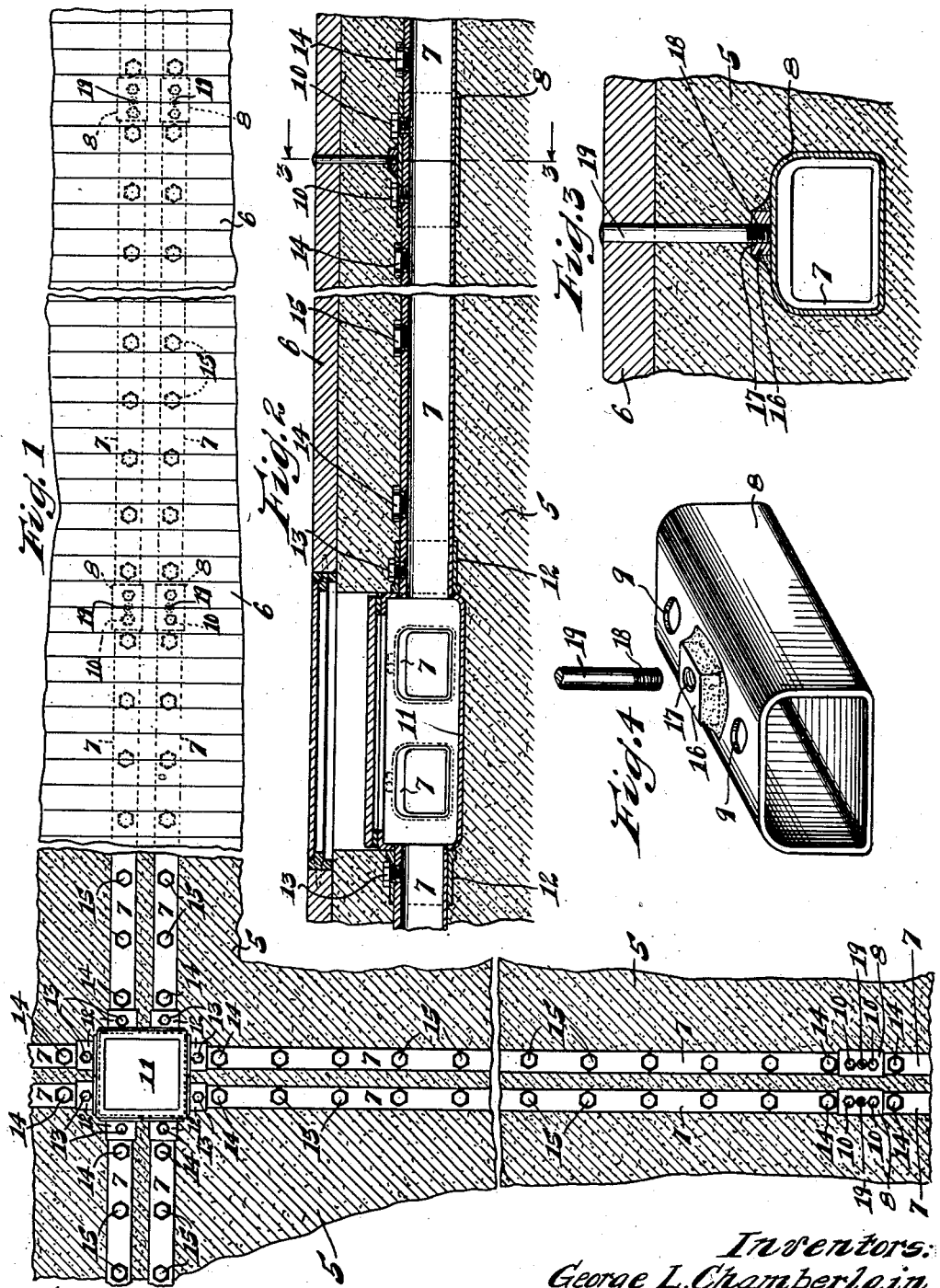

1,825,049

UNITED STATES PATENT OFFICE

GEORGE L. CHAMBERLAIN AND GUSS H. GNEISS, OF CHICAGO, ILLINOIS

MEANS FOR LOCATING CONDUIT OUTLETS

Application filed July 8, 1929. Serial No. 376,771.

This invention relates to underfloor duct systems, and more particularly to means in connection therewith for determining the location of concealed provisions for outlet openings in the respective conduits of the system.

In systems of this character, particularly in concrete building structures, it is the usual practice to embed, and, in most cases, to entirely conceal the conduits or ducts within the concrete body of the floor. Provision is made for outlet connections with the respective conduits or ducts either at the time of original installation or subsequently, as occasion may require. In some cases outlet openings are provided at intervals in the top walls of the conduits or ducts, said openings being normally closed by removable closures, usually of the plug type. In other cases the openings are drilled or otherwise cut in the conduit or duct at the time the connection is to be made. In either case, however, it is usually necessary to drill through the floor to reach the place of attachment to the conduit or duct, which is difficult to determine without provision for a marker of some character. In other cases the closure plugs for the openings that are provided in the conduits are extended upwardly so as to have the top portion thereof flush with the face of the floor, or else provided with a marker screw or extension element which is brought flush with the surface of the floor. There are many instances, however, where it is desirable or necessary to embed the conduits at a considerable depth below the surface of the floor and it is not practical nor economical to use the last noted means.

The present invention has for its principal object to provide simple, economical and practical means for locating the respective places where provision has been made prior to installation of the conduits or ducts for making outlet connections therewith, and to attain certain advantages as will hereinafter more fully appear.

The invention consists essentially in the provision of a novel marker, visible at the surface of the floor and coinciding with the end of a unitary duct section and being correlated to predetermined places of outlet in the duct. The invention further consists in the parts and arrangements and combinations of parts hereinafter specified and pointed out with particularity in the appended claims.

In the accompanying drawings, forming part of this specification and illustrating a practical adaptation of the invention, Fig. 1 is a fragmentary partial top plan and horizontal section of a portion of a floor structure, illustrating correlated features of the invention as applied thereto;

Fig. 2 is a fragmentary vertical section, on an enlarged scale, through a duct in the region of the jointure at the meeting ends of two sections thereof and through a junction box;

Fig. 3 is a section on the line 3—3 of Fig. 2; and

Fig. 4 is a perspective view of a coupling sleeve and portion of a marker element detached.

Referring now to the drawings, the numeral 5 designates a concrete floor structure which, as shown, is provided with a wooden of other finishing surface 6. Installed in this floor is a duct system comprising a series of tubular sections 7 which are produced in unitary lengths.

The respective duct sections 7 are joined at their meeting ends by coupling sleeves 8, said sleeves having apertures 9 for the reception of screw bolts 10 which are secured in screw threaded apertures provided therefor in the end portions of the respective duct sections.

The duct sections 7 are also attachable to junction boxes 11 having openings in their side walls with which cooperate couplings elements 12 secured on the outer faces of the side walls of the boxes and having apertures similar to the apertures 9 of the coupling elements 8 for the reception of screw bolts 13, similar to the bolts 10, which engage in the openings provided in the ends of the duct sections in a manner similar to that in which the attachment is effected by the coupling sleeves 8.

At a predetermined distance from each end of the respective duct sections 7 an outlet opening is provided in the upper wall of the section, which is closed by removable screw plug 14, and at regular intervals between said openings is a series of other openings closed by similar plugs 15. For example, said duct sections 7 may be produced in unitary lengths of ten feet. In this case the endmost apertures which are provided in the duct for the reception of the screw bolts which attach it to the coupling members 8 or 12, as the case may be, are located with their centers one inch inward from the opposite ends of the section, and the first outlet opening next adjacent to each of said endmost openings being located with their centers two inches from the said endmost openings, or three inches from the respective ends of the section. The intermediate series of outlet openings are located at intervals of six inches between centers.

At the center of the top wall of the coupling sleeve 8 is a boss 16 which is provided with a screw threaded aperture 17 for the reception of the correspondingly screw threaded end portion 18 of a marker rod 19, which latter projects vertically upward through the floor. The boss 16 may be formed integral with the coupling member 8, but as the member 8 in most cases will be produced as ordinary tubing, it is preferable to weld a nut on the upper wall of said member in order to provide the boss as shown in Fig. 4 of the drawings. The marker 19 may be an ordinary iron rod, and in practice these rods will be made in lengths to project some distance above the surface of the floor at the time of installation, and after the finishing surface or covering of the floor is laid said rods may be either left projecting above the surface, if in a location where this is permissible, or said rods may be cut off close to the surface of the floor and hammered down or otherwise neatly leveled flush therewith.

Obviously, by following a straight line directly between the exposed ends of two of said markers 19, and knowing that the respective plugged outlet openings are located at certain distances apart, and from the ends of the embedded duct sections which, of course, coincide with the axes of said markers 19, it is an easy matter to determine the exact place on the surface where the opening should be cut in the floor to gain access to that particular outlet opening it is desired to tap. As the end of the duct which is connected to a junction box comes substantially flush with the side wall of the box, the outlet openings in the conduit may be also located by measuring the distance from said side wall and following a straight line between the vertical center of the duct where it joins the box and the marker at the opposite end of said duct.

By providing the markers 19 at the middle of the respective coupling members 8 the exact direction in which the respective duct sections lie under the floor may be readily traced along the surface of the floor, whether said ducts are in direct alignment or are laid in a zigzag direction, which latter condition very often exists, no matter how carefully the ducts were originally placed before the pouring of the concrete, during which process the ducts are liable to become shifted out of their true axial alignment, owing to the very rough character of the work.

The particular construction and arrangement shown in the accompanying drawings is for the purpose of illustrating a practical adaptation of the invention, and the same admits of considerable modication and alteration without in the least departing from the spirit and scope of the invention as defined by the appended claims.

Having thus described our invention, what we claim as new and desire to secure by Letters Patent is:

1. In an undersurface wiring system, a unitary duct section having places for outlet located at predetermined intervals in the length thereof, and a marker element perpendicularly coincident with the ends of said duct section in definite measured relation to said places of outlet and visible above the surface under which the duct is concealed for determining the direction in which said duct section extends and the location of the said predetermined places of outlet.

2. In an undersurface wiring system, a duct section having places of outlet located at predetermined intervals in the length thereof, and means for determining the lineal direction of said duct section and concealed location of said places of outlet, comprising marker rods axially coincident with the ends of said duct section and extending substantially perpendicularly therefrom in definite measured relation to said places of outlet and being visible above the surface under which the duct is concealed.

3. In an undersurface wiring system, a series of duct sections placed end to end in communication with each other, said duct sections having places of outlet located at predetermined intervals in the length thereof, and coupling means for the meeting ends of said duct sections having substantially perpendicular marker rods extending axially coincident and medially between the ends of said duct sections and being visible above the surface under which said duct sections are concealed.

4. In a wiring system of the character described, a series of duct sections, each section having outlet openings at predetermined intervals throughout the length of its side towards the surface under which the ducts are concealed, said openings being normally closed by removable plugs, and coupling members for joining the respective duct sections with their meeting ends abutting and in substantially axial alignment, said coupling members having perpendicular marker rods extending axially coincident and medially between the meeting ends of said duct sections and being visible above the surface under which the ducts are concealed.

5. In a concealed duct system of the character described, a series of intercommunicating duct sections joined end to end in abutting relation and in substantially axial alignment, said duct sections having outlet openings located at predetermined intervals in the length thereof, said openings being normally closed by removable closure elements, coupling sleeves for the meeting end portions of the respective adjoining duct sections, and marker rods secured to said coupling sleeves axially coincident and medially between the meeting ends of the joined duct sections, said marker rods extending at least to the surface under which the duct system is concealed.

6. A unitary tubular duct section and a coupling element therefor, said duct section having outlet openings at regular predetermined intervals in the length thereof, said openings being normally closed by removable closure elements, said duct section and said coupling element having definite means of attachment, and a marker rod attachable perpendicularly to said coupling element substantially axially coincident with the end of the duct section in measured relation to said outlet openings.

In testimony whereof we have signed our names to this specification.

GEORGE L. CHAMBERLAIN.
GUSS H. GNEISS.